(12) United States Patent
Cherif et al.

(10) Patent No.: US 12,542,182 B2
(45) Date of Patent: Feb. 3, 2026

(54) MULTI-LEVEL DRIVE OF CONTENT ADDRESSABLE MEMORY (CAM) CELLS

(71) Applicant: NORTHROP GRUMMAN SYSTEMS CORPORATION, Falls Church, VA (US)

(72) Inventors: Bouchaib Cherif, Yorktown Heights, NY (US); Michael Anthony Tomlinson, Manchester, MD (US); Michelle A Williams, Laurel, MD (US); Nishant Zachariah, Woodstock, MD (US); Philippe Pouliquen, Baltimore, MD (US); Andreas Andreou, Baltimore, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 159 days.

(21) Appl. No.: 18/398,876

(22) Filed: Dec. 28, 2023

(65) Prior Publication Data

US 2025/0218511 A1    Jul. 3, 2025

(51) Int. Cl.
*G11C 11/04*        (2006.01)
*G11C 15/04*        (2006.01)

(52) U.S. Cl.
CPC ..................... *G11C 15/04* (2013.01)

(58) Field of Classification Search
CPC ...................................................... G11C 15/04
See application file for complete search history.

(56) References Cited

U.S. PATENT DOCUMENTS

| | | |
|---|---|---|
| 6,101,116 A | 8/2000 | Lien et al. |
| 8,031,502 B2 | 10/2011 | Kim |
| 11,152,067 B2 | 10/2021 | Choi et al. |
| 2005/0152166 A1 | 7/2005 | Patel |
| 2022/0172789 A1 | 6/2022 | Piccardi |
| 2022/0254404 A1 | 8/2022 | Wan et al. |
| 2022/0309328 A1* | 9/2022 | Saxena .................. G06N 3/065 |

OTHER PUBLICATIONS

International Search Report and Written Opinion mailed Mar. 21, 2025, from International Patent Application PCT/US2024/053407, 20 sheets.

\* cited by examiner

*Primary Examiner* — Hoai V Ho
(74) *Attorney, Agent, or Firm* — KATTEN MUCHIN ROSENMAN LLP (57) ABSTRACT

A content addressable memory (CAM) circuit includes a word line driver that incorporates a digital-to-analog converters (DAC), which enables the CAM circuit to store an n-bit value only with n CAM cells. The CAM circuit includes one or more of CAM cells configured to store bit values, at least one word line driver coupled to word lines of the CAM cells and configured to supply word line output to drive the CAM cells, and at least one bit line driver coupled to bit lines of the CAM cells and configured to supply bit line outputs to drive the CAM cells. The word line driver and the bit line driver include DAC circuits that includes PFETs and NFETs.

14 Claims, 9 Drawing Sheets

MULTI-LEVEL DRIVE OF CONTENT ADDRESSABLE MEMORY (CAM) CELLS

BACKGROUND

A content-addressable memory (CAM) is a storage structure that accesses stored content or value by content rather than by location. In addition to the writing and reading operations which memory devices such as static random access memory (SRAM) and dynamic random access memory (DRAM) provide, CAM allows parallel search operations based on content stored in CAM cell arrays.

Arrays of CAM cells are used for vector-matrix multiplications in AI and ML inference. They allow a bit to be stored while simultaneously performing any Boolean single bit operation (depending on the wiring of the cell). Some AI and ML problems are not amenable to low precision (1 bit) computations and require multi-level encoding of the vector and matrix components. However, if the desired operation of the CAM cells is for a multi-bit value, the conventional approach is to encode the values in unary. The conventional approach requires $2^n$ CAM cells to store a n-bit value. Consequently, when the CAM cells are formed in a chip, the conventional approach requires a dramatic increase of cell area for multi-bit value.

SUMMARY

The disclosed invention provides a CAM circuit that enables multi-level computation with a reduced number of CAM cells to both store n-bit values and input n-bit values. The CAM circuit includes a word line driver that incorporates a digital-to-analog converter (DAC), which enables a multi-bit input value to be applied to the CAM cell array, which enables the CAM circuit to compute with n-bit inputs with n CAM cells, instead of $2^n$ CAM cells required in the conventional approach. The CAM circuit also includes a bit line driver that incorporates digital to analog converters, which enables the CAM circuit to store an n-bit value with n CAM cells, instead of $2^n$ CAM cells required in the conventional approach. The CAM circuit of the disclosed invention significantly reduces the cell area of a chip for multi-level computations, which leads to cost reduction and/or larger array capacities.

These advantages and others are achieved, for example, by a content addressable memory (CAM) circuit. The CAM circuit includes one or more of CAM cells configured to store bit values and at least one word line driver coupled to word lines of the one or more CAM cells and configured to supply output to drive the word lines of the one or more CAM cells. The word line driver includes a first transistor, a second transistor, a current source generating a first current, a third transistor, a first digital-to-analog converter (DAC) coupled to a source of the third transistor and gate of the first transistor, a second DAC coupled to a drain of the third transistor, and an operational amplifier (OpAmp). The drain of the second transistor is coupled to a drain of the first transistor. The source of the second transistor is coupled to the current source and a gate of the first transistor is coupled to the current source. The first transistor, the second transistor and the current source are configured to generate a reference voltage. The OpAmp includes a first input terminal coupled to the drain of the third transistor, a second input terminal coupled to the drain of the second transistor, and an output terminal supplying the output to drive the word lines of the CAM cells.

These advantages and others are also achieved, for example, by a content addressable memory (CAM) circuit that includes one or more of CAM cells configured to store bit values and at least one bit line driver coupled to bit lines of the one or more CAM cells and configured to supply output to drive the bit lines of the one or more CAM cells. The bit line driver includes a first transistor, a second transistor, a digital-to-analog converter (DAC) coupled to a source of the second transistor and a gate of the first transistor, and an operational amplifier (OpAmp). The drain of the second transistor is coupled to the drain of the first transistor. The OpAmp includes a first input terminal coupled to the source of the second transistor, an output terminal supplying the output to drive the bit lines of the CAM cells, and a second input terminal coupled to the output terminal.

BRIEF DESCRIPTION OF THE DRAWINGS

The preferred embodiments described herein and illustrated by the drawings hereinafter are to illustrate and not to limit the invention, where like designations denote like elements.

DETAILED DESCRIPTION

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

Figure 1A:
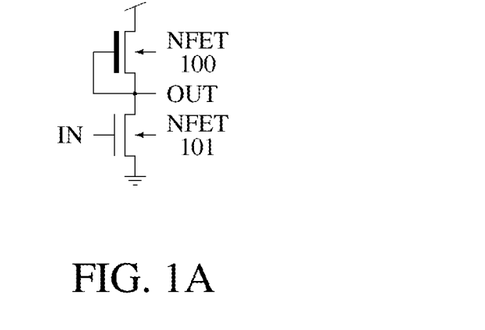
FIG. 1A is a circuit diagram of an inverter in an NMOS process.
Figure 1B:
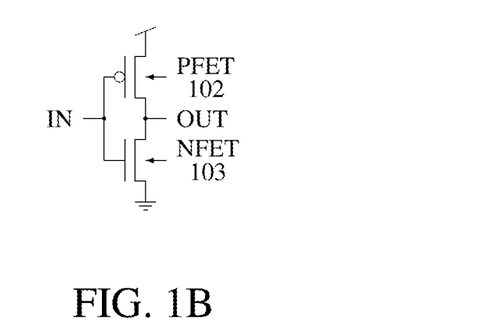
FIG. 1B is a circuit diagram of an inverter in a CMOS process.
Figure 1C:
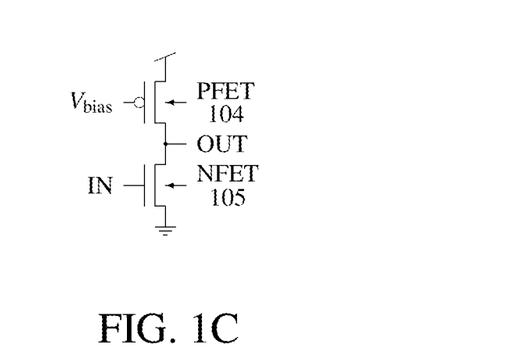
FIG. 1C is a circuit diagram of a pseudo-NMOS inverter in a CMOS process.
Figure 1D:
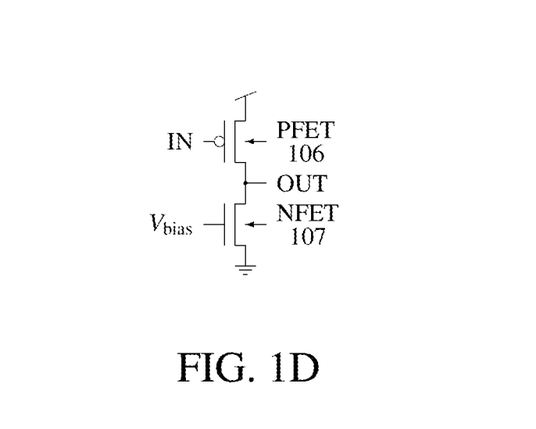
FIG. 1D is a circuit diagram of a pseudo-PMOS inverter in a CMOS process.

With reference to FIGS. 1A to 1E, shown are various implementations of digital inverters. FIG. 1A illustrates the construction of an inverter in a older NMOS type process. NMOS processes have only n-channel field effect transistor (NFET) transistors 100, 101, but provides a depletion-mode version in addition to the conventional enhancement mode version. The depletion mode NFET has its gate terminal tied to its source terminal, so that it behaves like a constant current source. The depletion mode NFET can be used as a load (i.e. a passive pull-up) when constructing various digital logic gates. Current VLSI fabrication processes are typically CMOS type, wherein all transistors are enhancement mode, but the process provides both NFET and p-channel field effect transistor (PFET) devices. FIG. 1B illustrates a conventional inverter in a CMOS process including PFET 102 and NFET 103. CMOS processes have various advantages and disadvantages relative to NMOS processes. However, one can emulate the NMOS process inverter by using a PFET with a constant gate bias. FIG. 1C illustrates this inverter construction including PFET 104 and NFET 105, which is referred to as a pseudo-NMOS inverter. Similarly, one can apply a constant gate bias to the NFET, resulting in the pseudo-PMOS inverter including PFET 106 and NFET 107 shown in FIG. 1D.

Figure 1E:
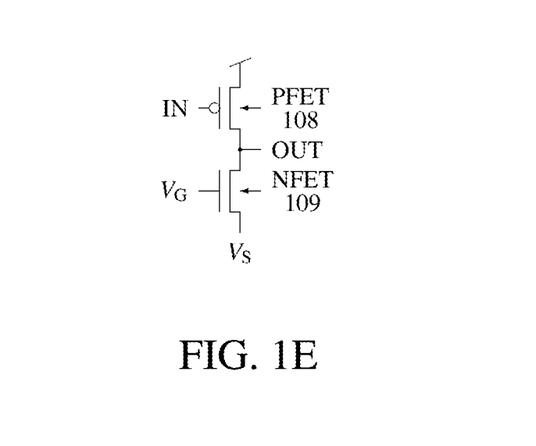
FIG. 1E is a circuit diagram of a pseudo-PMOS inverter with a variable source bias.

With reference to FIG. 1E, shown is a pseudo-PMOS inverter wherein the source terminal of the NFET 109 is not connected to ground (i.e., the negative power supply), but is instead connected to an arbitrary voltage Vs. If NFET 109 is operated in the subthreshold regime and the source terminal is connected to the bulk terminal, then the current Id in NFET 109 will be exponentially related to the voltages at the gate and source terminals of NFET 109. That is, $$I_D = I_0 e^{\frac{kV_{GS}}{v_t}} = I_0 e^{\frac{kV_G}{v_t}} e^{\frac{-kV_S}{v_t}},$$

enabling the multiplication of the gate and source effects. Note that the current flows only when the input IN signal is low, which turns on PFET 108, and pulls the output OUT high. When the input signal IN is high, PFET 108 is off, no current flows, and NFET 109 pulls the output OUT low.

Figure 2:
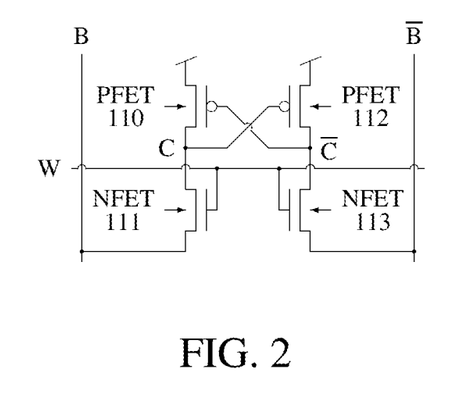
FIG. 2 is a circuit diagram of a static-RAM (random access memory) cell using two cross-coupled pseudo-PMOS inverters of FIG. 1E.

With reference to FIG. 2, shown is a static random-access memory (RAM) cell, using cross-coupled pseudo-PMOS inverters including PFET 110, 112. The bit lines B and $\overline{B}$ are connected to the source terminals of NFET 111, 113 and the word line W is connected to gate terminals of the NFET 111, 113. The state of the RAM cell can be determined by monitoring the current flow on the bit lines. When the state is 1 (i.e. C is high and $\overline{C}$ is low), current will flow out of the source terminal of NFET 111 onto bit line B. When the stored state is 0 (i.e. C is low and $\overline{C}$ is high), current will flow out of the source terminal of NFET 113 onto bit line B.

Figure 3:
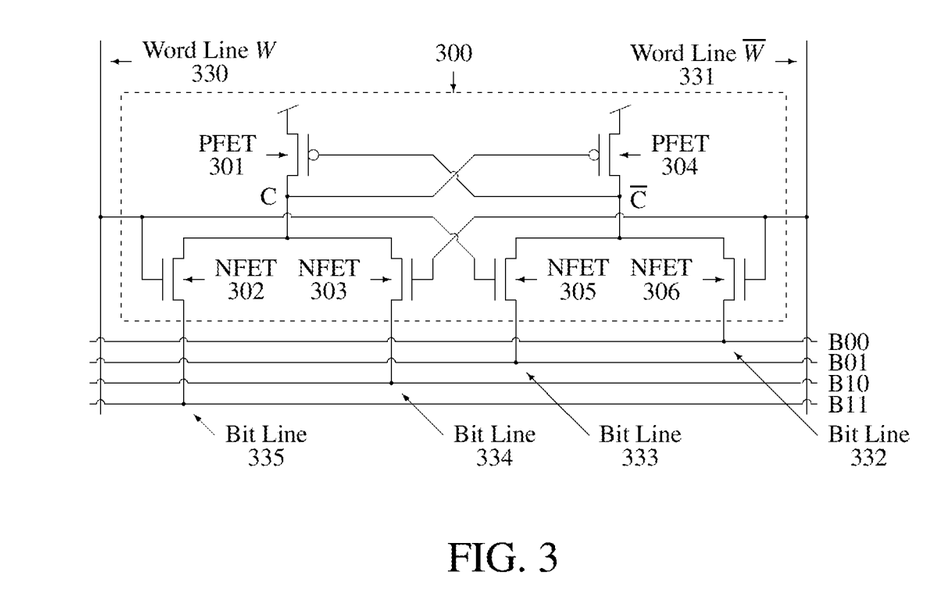
FIG. 3 is a circuit diagram of a content addressable memory (CAM) cell of the disclosed invention, based on the pseudo-PMOS inverter of FIG. 1E.

With reference to FIG. 3, shown is a diagram of a content addressable memory (CAM) cell 300 of the disclosed invention. In an embodiment of the disclosed invention, each CAM cell 300 includes six (6) transistors, among which transistors PFET 301 and 304 are p-channel metal-oxide semiconductor (PMOS) transistors and transistors NFET 302, 303, 305 and 306 are n-channel metal-oxide semiconductor (NMOS) transistors.

The transistors 301, 302 and 303 of the CAM cell 300 are configured as pseudo-PMOS inverters with input transistor 301 and dual load transistors 302 and 303, and transistors 304, 305 and 306 are also configured as pseudo-PMOS inverters with input transistor 304 and dual load transistors 305 and 306. As shown in FIG. 3, the gate of PFET 301 is coupled to the drain of PFET 304 and drains of NFETs 305 and 306. The gate of PFET 304 is coupled to the drain of PFET 301 and drains of NFETs 302 and 303. Herein, "coupled" means that elements are capable of being electrically connected.

When used without the word line driver of the disclosed invention, load transistors NFET 302, 303, 305 and 306 are controlled by two mutually exclusive input word lines W 330 and $\overline{W}$ 331. In other words, the first and second word lines 330, 331 are supplied with or controlled by mutually exclusive word line signals. The gates of NFETs 302 and 305 are coupled to the first word line W 330 and the gates of NFETs 303, 305 are coupled to the second word line $\overline{W}$ 331. The sources of NFETs 302, 303, 305, 306 are coupled to four (4) output bit lines B11 335, B10 334, BI 333, B00 332.

The four (4) output bit lines 332-335 respectively provide outputs representing four possible Boolean AND operations B11, B10, B01 and B00 between the state of the word lines and the CAM cell state: one bit line for each combination of 00, 01, 10 and 11. One output bit line among the output bit lines 332-335, which carries the unit current, is the one corresponding to the current state of the word line and the cell state. For example, if the word line state and the cell state are both one (1), then the output bit line B11 335 will have the unit current and the other three will have zero current. If the word line state is one (1) and the cell state is zero (0), the output bit line B01 333 will have the unit current and the other three will have zero current. If the word line state is zero (0) and the cell state is one (1), the output bit line B10 334 will have the unit current and the other three will have zero current. If the word line state and the cell state are both zero (0), the output bit line B00 332 will have the unit current and the other three will have zero current. When used without the word line driver of the disclosed invention, the word lines represent a single bit, and therefore the word lines must be in one of two complementary states. Either W is at a high voltage and W is at a low voltage, or W is at a low voltage and W is at a high voltage. Furthermore, all the bit lines B00, B01, B10, B11 are at the same voltage. The disclosed invention proposes a novel word line driver allowing the word lines to represent multi-level inputs and a novel bit line driver allowing the stored states to represent multi-bit stored values, such that the currents on the bit lines are the product of the multi-level input and multi-bit stored value.

Figure 4:
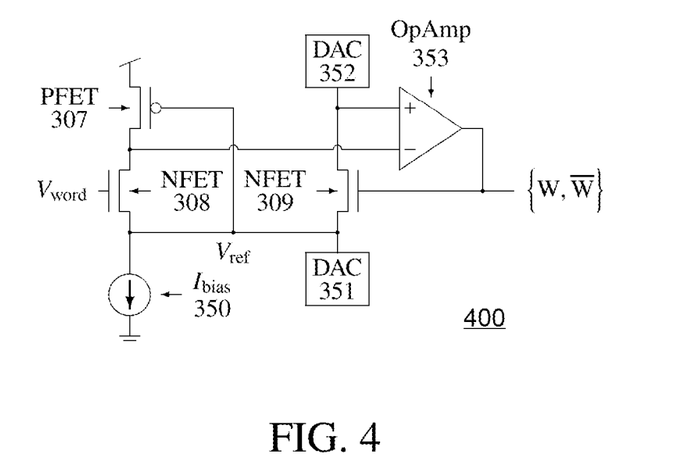
FIG. 4 is a circuit diagram of a word line driver of the disclosed invention, which is configured to drive CAM cells shown in FIG. 3.

With reference to FIG. 4, shown is a diagram of a word line driver 400 of the disclosed invention, which is used for the CAM circuit 300 shown in FIG. 3. The disclosed invention replaces the normal word line drivers with circuits incorporating digital-to-analog converters (DACs) 351, 352, without altering the design or arrangement of the CAM cells 300.

The word line driver 400 of the disclosed invention includes PFET 307, NFETs 308 and 309, bias current source $I_{bias}$ 350, DACs 351 and 352, and operational amplifier 353. The drain of PFET 307 is coupled to the drain of the NFET 308, and the source of NFET 308 is coupled to the bias current source $I_{bias}$ 350. The gate of PFET 307 is coupled to the bias current source $I_{bias}$ 350 and the first current DAC 351 and the sources of NFETs 308 and 309. The PFET 307, the NFET 308 and the bias current source $I_{bias}$ 350 generate a reference voltage Vref, which is the desired bit line voltage for nominal operation.

The output of the first current DAC 351 is coupled to the source of NFET 309 and the output of the second current DAC 352 is coupled to the drain of NFET 309. Both current DACs 351 and 352 generate the same amount of electrical current to set the current in NFET 309. Operational amplifier 353 has its non-inverting input coupled to the drain of NFET 309 and its inverting input coupled to the drain of NFET 308. The output of operational amplifier 353 drives the gate terminal of NFET 309 and a word line. DACs 351 352 output a current $I_{word}$ that is related to $I_{bias}$. For example, the output current $I_{word}$ might be an integer multiple of $I_{bias}$, with the integer being the digital input to the DACs. The purpose of the circuit is to compute a word line voltage which, when applied to the gates of the load transistors in the CAM cell, will produce the same output current $I_{word}$ when the bit lines are at their nominal voltage level Vref. Each word line requires a dedicated word line driver circuit 400.

Figure 5:
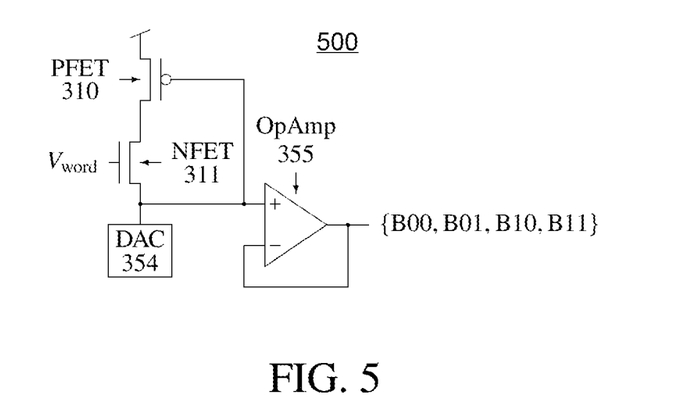
FIG. 5 is a circuit diagram of a bit line driver of the disclosed invention, which is configured to drive CAM cells shown in FIG. 3.

With reference to FIG. 5, shown is a diagram of a bit line driver 500 of the disclosed invention, which is used for the CAM circuit 300 shown in FIG. 3. The bit line driver 500 of the disclosed invention includes PFET 310, NFET 311, DAC 354 and operational amplifier 355. The drain of PFET 310 is coupled to the drain of NFET 311. The source of NFET 311 is coupled to the output of current DAC 354 and the gate of PFET 310. Operational amplifier 355 has its non-inverting input coupled to the source of NFET 311 and its inverting input coupled to its output. The output of operational amplifier 355 drives a bit line. DAC 354 outputs a current $I_{bit}$ that is related to $I_{bias}$. For example, the output current $I_{bit}$ might be an integer multiple of $I_{bias}$, with the integer being the digital input to the DAC. The purpose of the circuit is to compute a bit line voltage which, when applied to the sources of the load transistors in the CAM cell, will produce the same output current $I_{bit}$ when the word lines are at their nominal voltage level $V_{word}$. Each bit line requires a dedicated bit line driver 500.

The computation of the CAM cell output current is as follows. The current in NFET 308 of FIG. 4 is $$I_{bias} = I_0 e^{\frac{kV_{word}}{v_t}} e^{\frac{-kV_{ref}}{v_t}},$$

while the current in NFET 309 of FIG. 4 is $$I_{word} = I_0 e^{\frac{kV_w}{v_t}} e^{\frac{-kV_{ref}}{v_t}}$$

where $V_w$ is the resulting voltage on the word line. The current in NFET 311 of FIG. 5 is $$I_{bit} = I_0 e^{\frac{kV_{word}}{v_t}} e^{\frac{-kV_b}{v_t}}$$

where $V_b$ is the resulting voltage on the bit line. Lastly, the current in the load transistors of the CAM cell is $$I_{cam} = I_0 e^{\frac{kV_w}{v_t}} e^{\frac{-kV_b}{v_t}}.$$

Combining these equations yields $$I_{cam} = \frac{I_{word} I_{bit}}{I_{bias}}.$$

If $I_{word} = N \cdot I_{bias}$, where N is the digital input to current DACs 351 and 352, and $I_{bit} = I_{bias} \cdot M \cdot I_{bias}$, where M is the digital input to current DAC 354, then $I_{cam} = N \cdot M \cdot I_{bias}$.

Figure 6A:
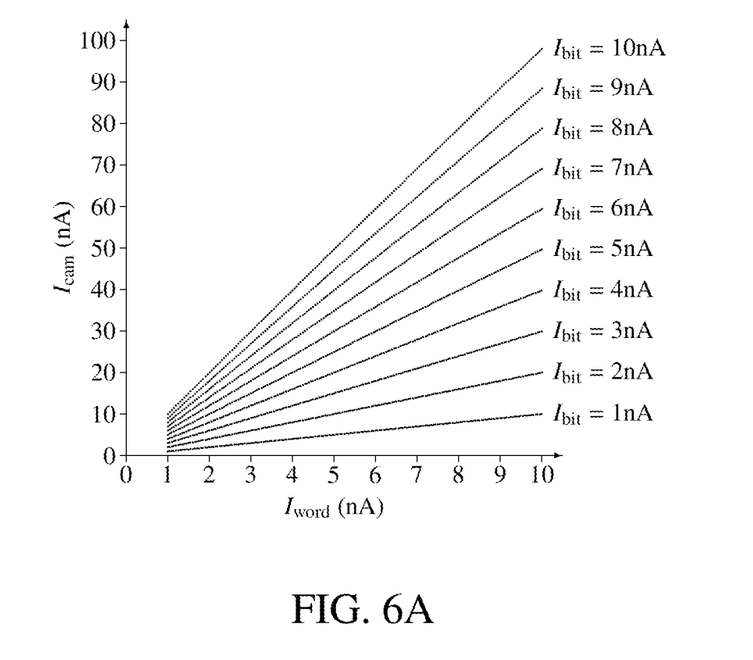
FIGS. 6A to 6C show simulation results obtained by using the CAM circuit of the disclosed invention.
Figure 6B:
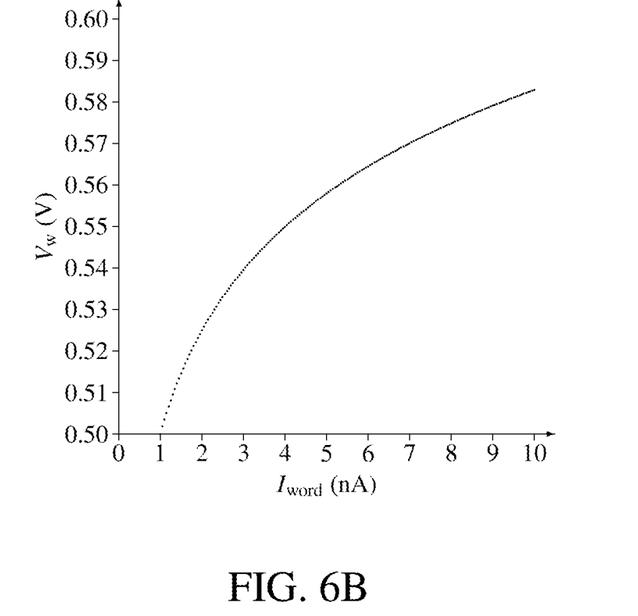
Figure 6C:
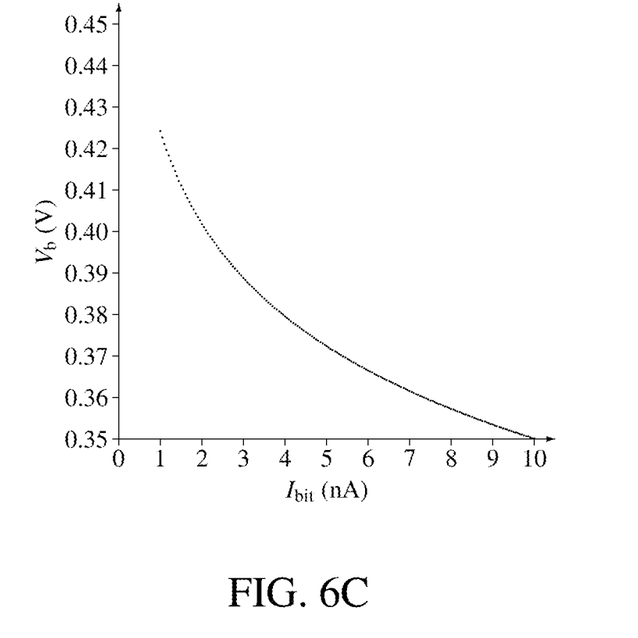

With reference to FIGS. 6A to 6C, shown are simulation results for the combination of the word line driver circuit 400 and bit line driver circuit 500 with a bias current $I_{bias}$ as is set to 1 nA. In FIG. 6A, the horizontal axis is the word line current $I_{word}$ that is swept from 1 nA to 10 nA. The vertical axis is output current $I_{cam}$ of the CAM cell. The bit line current $I_{bit}$ is stepped from 1 nA to 10 nA. The product therefore ranges from 1 nA to 100 nA. In FIG. 6B, an example simulation of the word line voltage from the word line driver circuit is shown as a function of the word line current $I_{word}$, that is swept form 1 nA to 10 nA. In FIG. 6C, an example simulation of the bit line voltage from the bit line drive circuit is shown as a function of the bit line current $I_{bit}$, that is swept from 1 nA to 10 nA.

Figure 7A:
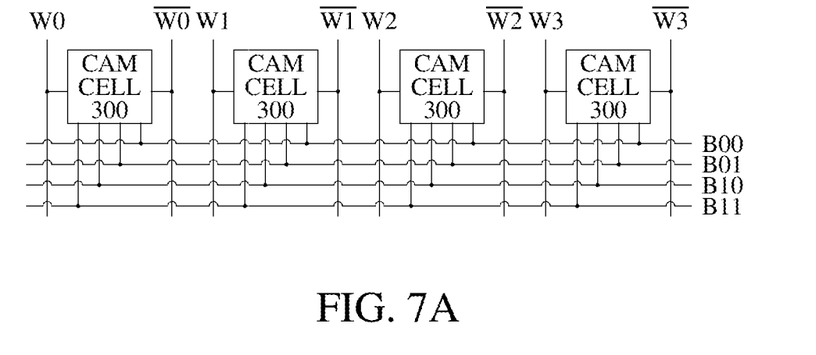
FIG. 7A shows an example of achieving multi-bit input capability using unary encoding of the word lines.
Figure 7B:
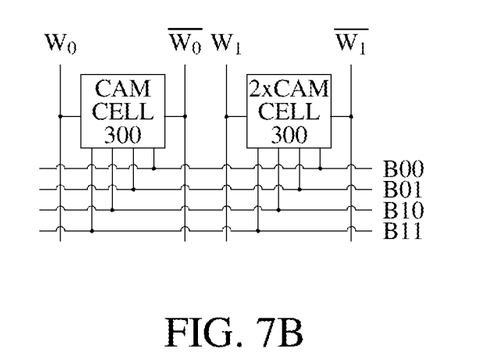
FIG. 7B shows an example of achieving multi-bit input capability using binary weighted CAM cells.

With reference to FIGS. 7A to 7C, shown are various CAM cell topologies for achieving multi-bit inputs on the word lines. In FIG. 7A, three CAM cell are used, wherein each CAM cell stores the same bit, but the 2-bit word line value is encoded in unary. That is, if the input value is 1, only one of W0, W1 and W2 will be at a high voltage (typically W0). If the input value is two (2), only two of W0, W1 and W2 will be at a high voltage (typically W0 and W1). If the input value is three (3), all three of W0, W1 and W2 will be at a high voltage. If the input value is zero (0), then none of W0, W1 and W2 will be at a high voltage. Alternatively, in FIG. 7B, two CAM cells are used, but the transistors in the second CAM cell are twice as large, so that they produce twice the current for the same terminal voltages. Consequently, the 2-bit word line value can be directly applied, with the least significant bit controlling $W_0$ and the most significant bit controlling $W_1$. While it may seem like this is a smaller circuit, the second CAM cell is likely to be twice the area of the first, so that the total area is equivalent to the topology shown in FIG. 7A.

Figure 7C:
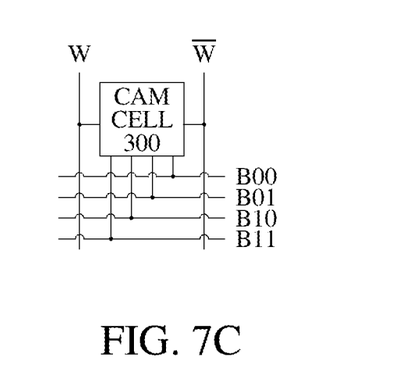
FIG. 7C shows an example of achieving multi-bit input capability using of the disclosed invention using the multi-level word line driver circuit.

In contrast, the disclosed invention enables the use of a single CAM cell as shown in FIG. 7C, wherein the multi-value input is applied to the word lines using the word line driver described in FIG. 4. Although the word line driver represents some overhead in area, the area is amortized over all the CAM cells in a column in a CAM cell array.

Figure 8A:
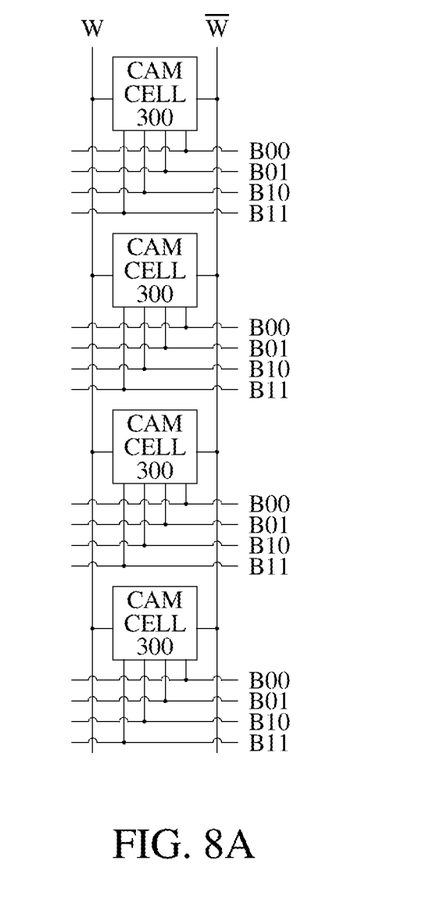
FIG. 8A shows an example of achieving multi-bit storage capability using unary encoding of the stored state.
Figure 8B:
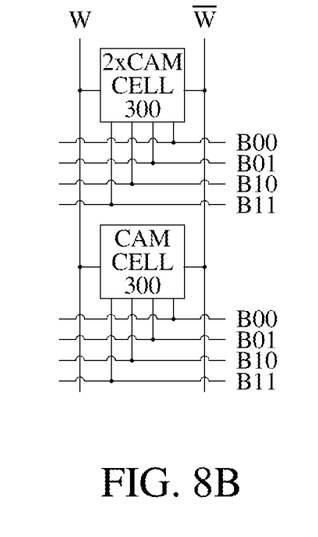
FIG. 8B shows an example of achieving multi-bit storage capability using binary weighted CAM cells.

With reference to FIGS. 8A to 8C, shown are various CAM cell topologies for achieving multi-bit storage in the CAM cells. In FIG. 8A, three CAM cell are used, wherein each CAM cell stores a unary encoding of a 2-bit value. That is, if the stored value is one (1), one of the CAM cells will have a one (1) stored and the other two will have a zero (0) stored. If the input value is two (2), two of the CAM cells will have a one (1) stored and the other will have a zero (0) stored. If the input value is three (3), all three CAM cells will have a one (1) stored. If the input value is a zero (0), then all three CAM cells will have a zero (0) stored. Alternatively, in FIG. 8B, two CAM cells are used, but the transistors in the upper CAM cell are twice as large, so that they produce twice the current for the same terminal voltages. Consequently, the 2-bit value can be directly stored, with the least significant bit stored in the lower CAM cell and the most significant bit stored in the upper CAM cell. As with FIG. 7B, while it may seem like this is a smaller circuit, the second CAM cell is likely to be twice the area of the first, so that the total area is equivalent to the topology shown in FIG. 8A.

Figure 8C:
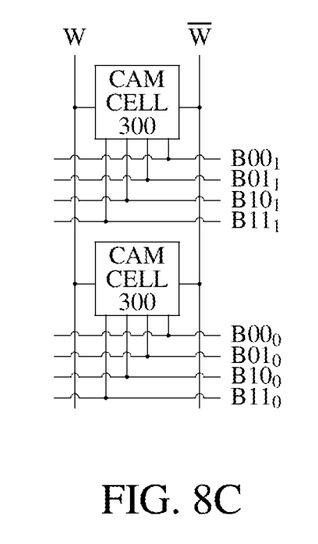
FIG. 8C shows an example of achieving multi-bit storage capability using the multi-level bit line driver of the disclosed invention.

In contrast, the described invention enables the use of a single CAM cell as shown in FIG. 8C, wherein the $2^n$ multi-bit value is stored directly in the n CAM cells. The bit line driver is used to multiply the bit line currents according to their weights. In FIG. 8C, the upper CAM cell, which stores the most significant bit of the 2-bit value, has its output current multiplied by two (2), whereas the lower CAM cell, which stores the least significant bit, has its output current multiplied by one (1). Although the bit line driver represents some overhead in area, the area is amortized over all the CAM cells in a row in a CAM cell array.

In the disclosed invention, the word line driver and the bit line driver may be used separately or may be used together.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A content addressable memory (CAM) circuit, comprising:
    one or more CAM cells configured to store bit values; and
    at least one word line driver coupled to word lines of the one or more CAM cells and configured to supply output to drive the word lines of the one or more CAM cells, wherein the word line driver comprises:
        a first transistor;
        a second transistor, wherein a drain of the second transistor is coupled to a drain of the first transistor;
        a current source generating a first current, wherein a source of the second transistor is coupled to the current source and a gate of the first transistor is coupled to the current source, and wherein the first transistor, the second transistor and the current source are configured to generate a reference voltage;
        a third transistor;
        a first digital-to-analog converter (DAC) coupled to a source of the third transistor and gate of the first transistor;
        a second DAC coupled to a drain of the third transistor; and
        an operational amplifier (OpAmp) comprising:
            a first input terminal coupled to the drain of the third transistor;
            a second input terminal coupled to the drain of the second transistor; and
            an output terminal supplying the output to drive the word lines of the CAM cells.

2. The CAM circuit of claim 1 wherein the first transistor of the word line driver is a p-channel field effect transistor (PFET) and the second and third transistors of the word line driver are n-channel field effect transistors (NFETs).

3. The CAM circuit of claim 1 wherein the output terminal of the OpAmp of the word line driver is coupled to a gate of the third transistor of the word line driver.

4. The CAM circuit of claim 1 wherein the first DAC and the second DAC of the word line driver are configured to generate the same amount of electrical current.

5. The CAM circuit of claim 1 wherein each CAM cell comprises:
    a first transistor;
    a second transistor, wherein a gate of the second transistor is coupled to a first word line, and a source of the second transistor is coupled to a first bit line;
    a third transistor, wherein a gate of the third transistor is coupled to a second word line, and a source of the third transistor is coupled to a second bit line,
    a fourth transistor, wherein a gate of the fourth transistor is coupled to drains of the first, second and third transistors;
    a fifth transistor, wherein a gate of the fifth transistor is coupled to the first word line, and a source of the fifth transistor is coupled to a third bit line; and
    a sixth transistor, wherein a gate of the sixth transistor is coupled to the second word line and a source of the sixth transistor is coupled to a fourth bit line, and wherein a gate of the first transistor is coupled to drains of the fourth, fifth and sixth transistors.

6. The CAM circuit of claim 5 wherein the first and fourth transistors of the CAM cell are p-channel field effect transistors (PFETs) and the second, third, fifth and sixth transistors of the CAM cell are n-channel field effect transistors (NFETs).

7. The CAM circuit of claim 5 wherein the first and second word lines are controlled by mutually exclusive word line signals.

8. The CAM circuit of claim 5 wherein the sources of the second, third, fifth and sixth transistors respectively provide output representing Boolean operations between state of the first and second word lines and state of the CAM cell.

9. The CAM circuit of claim 1 further comprising at least one bit line driver coupled to bit lines of the one or more CAM cells and configured to supply output to drive the bit lines of the one or more CAM cells, wherein the bit line driver comprises:
    a first transistor;
    a second transistor, wherein a drain of the second transistor is coupled to a drain of the first transistor; and
    a DAC coupled to a source of the second transistor and a gate of the first transistor; and
    an operational amplifier (OpAmp) comprising:
        a first input terminal coupled to the source of the second transistor;
        an output terminal supplying the output to drive the bit lines of the CAM cells; and
        a second input terminal coupled to the output terminal.

10. The CAM circuit of claim 9 wherein the first transistor of the bit line driver is a p-channel field effect transistor (PFET) and the second transistor of the bit line driver is n-channel field effect transistor (NFET).

11. A content addressable memory (CAM) circuit, comprising:
    one or more word lines and one or more bit lines;
    one or more CAM cells configured to store bit values, wherein the one or more CAM cells are connected to the one or more word lines to receive word line signals and connected to the one or more bit lines to receive bit inputs;

at least one bit line driver configured to supply the bit inputs to the one or more bit lines; and at least one word line driver configured to supply word line signals to the one or more word lines, wherein the word line driver comprises:

a first transistor;

a second transistor, wherein a drain of the second transistor is coupled to a drain of the first transistor;

a current source generating a first current, wherein a source of the second transistor is coupled to the current source and a gate of the first transistor is coupled to the current source, and wherein the first transistor, the second transistor and the current source are configured to generate a reference voltage;

a third transistor;

a first DAC coupled to a source of the third transistor and gate of the first transistor;

a second DAC coupled to a drain of the third transistor; and an operational amplifier (OpAmp) comprising:

a first input terminal coupled to the drain of the third transistor; and a second input terminal coupled to the drain of the second transistor; and an output terminal supplying the output to drive the word lines of the CAM cells.

12. The CAM circuit of claim 11 wherein the first transistor of the word line driver is a p-channel field effect transistor (PFET) and the second and third transistors of the word line driver are n-channel field effect transistors (NFETs).

13. The CAM circuit of claim 11 wherein the output terminal of the OpAmp of the word line driver is coupled to a gate of the third transistor to drive the third transistor.

14. The CAM circuit of claim 11 wherein the first DAC and the second DAC of the word line driver are configured to generate the same amount of electrical current.

* * * * *